(12) United States Patent
Clay et al.

(10) Patent No.: US 12,524,462 B2
(45) Date of Patent: Jan. 13, 2026

(54) MEDIA IDENTIFICATION SYSTEM

(71) Applicant: AUDOO LIMITED, London (GB)

(72) Inventors: Oliver James Clay, Llanelli (GB); Stephen John Robbins, Bristol (GB)

(73) Assignee: AUDOO LIMITED, London (GB)

( * ) Notice: Subject to any disclaimer, the term of this patent is extended or adjusted under 35 U.S.C. 154(b) by 0 days.

(21) Appl. No.: 18/708,177

(22) PCT Filed: Nov. 17, 2022

(86) PCT No.: PCT/GB2022/052924
§ 371 (c)(1),
(2) Date: May 7, 2024

(87) PCT Pub. No.: WO2023/089324
PCT Pub. Date: May 25, 2023

(65) Prior Publication Data
US 2024/0303271 A1 Sep. 12, 2024

(30) Foreign Application Priority Data
Nov. 18, 2021 (GB) ...................... 2116661

(51) Int. Cl.
*G06F 16/68* (2019.01)
*G06F 3/16* (2006.01)
*G06F 16/638* (2019.01)
(52) U.S. Cl.
CPC ............ *G06F 16/686* (2019.01); *G06F 3/162* (2013.01); *G06F 16/638* (2019.01)

(58) Field of Classification Search
CPC ...... G06F 16/686; G06F 3/162; G06F 16/638; G06F 16/683; G06F 16/634; G06F 21/10; G06F 21/1078; G06Q 50/184
See application file for complete search history.

(56) References Cited

U.S. PATENT DOCUMENTS 9,996,612 B2 * 6/2018 Candelore .......... H04N 21/8456
10,089,987 B2 * 10/2018 Keal ........................ G10L 25/51
10,296,638 B1 * 5/2019 Chen ...................... G06F 16/68
10,839,007 B1 11/2020 Chen et al.
(Continued)

OTHER PUBLICATIONS

Intellectual Property Office Search Report dated May 3, 2022 in United Kingdom Application No. GB2116661.6 in 3 pages.
(Continued)

*Primary Examiner* — Jared M Bibbee
(74) *Attorney, Agent, or Firm* — Knobbe, Martens, Olson & Bear, LLP

(57) ABSTRACT

A media identification system is provided. The system comprises an audio input configured to receive an audio signal, and an audio clip extraction module configured to extract an audio clip from the audio signal. The system further comprises an audio clip processing module configured to generate metadata based upon the audio clip, and a first communication interface configured to transmit media identification data corresponding to the audio clip to a media identification server when the metadata based upon the audio clip meets a predetermined requirement, wherein the predetermined requirement comprises the metadata indicating that the audio clip comprises music.

10 Claims, 7 Drawing Sheets

(56) References Cited

U.S. PATENT DOCUMENTS

| | | | | |
|---|---|---|---|---|
| 2003/0028796 | A1* | 2/2003 | Roberts | G06F 16/7834 |
| | | | | 713/193 |
| 2010/0158488 | A1 | 6/2010 | Roberts et al. | |
| 2011/0035223 | A1* | 2/2011 | Schiller | G06F 16/68 |
| | | | | 704/260 |
| 2011/0137855 | A1* | 6/2011 | Shustef | G06F 16/683 |
| | | | | 707/769 |
| 2015/0286716 | A1* | 10/2015 | Snibbe | G06F 16/48 |
| | | | | 707/610 |
| 2017/0178681 | A1 | 6/2017 | Keal et al. | |
| 2019/0102144 | A1* | 4/2019 | Roblek | G06F 3/165 |
| 2020/0057780 | A1* | 2/2020 | Scavo | G06F 16/48 |
| 2020/0401367 | A1 | 12/2020 | Roblek et al. | |
| 2021/0160975 | A1 | 5/2021 | Cremer et al. | |
| 2021/0357451 | A1* | 11/2021 | Wold | G06F 16/68 |
| 2022/0043854 | A1* | 2/2022 | Sawruk | G06F 16/9538 |
| 2022/0350838 | A1* | 11/2022 | Henderson | G06F 16/68 |

OTHER PUBLICATIONS

Hareesh Bahuleyan, "Music Genre Classification using Machine Learning Techniques," arXiv, Apr. 3, 2018, 12 pages.

International Search Report and Written Opinion of the ISA for International Application No. PCT/GB2022/052924 dated Feb. 2, 2023, in 14 pages.

Written Opinion of the International Preliminary Examining Authority for International Application No. PCT/GB2022/052924 dated Sep. 22, 2023, in 7 pages.

\* cited by examiner

MEDIA IDENTIFICATION SYSTEM

PRIORITY AND RELATED APPLICATIONS

This application claims the benefit of PCT Application No. WO2023/089324 filed on April Nov. 17, 2022. The above-listed disclosure is incorporated herein by reference in its entirety. Any and all applications for which a foreign or domestic priority claim is identified in the Application Data Sheet as filed with the present application are hereby incorporated by reference under 37 CFR 1.57.

FIELD

The present invention is directed to media identification, and more particularly systems and methods for media identification.

BACKGROUND

Media identification systems, such as for music identification, typically involve sampling a stream, such as an audio feed, and comparing a sample to a library to identify a nearest matching media item, such as a nearest matching piece of music.

Problems faced by such media identification systems include providing an accurate determination of the media, making better use of computational resources, and making better use of communication resources. An object of the present disclosure is to provide a media identification system that addresses these problems, amongst others.

SUMMARY

In a first aspect, there is provided a media identification system, wherein the system comprises: an audio input configured to receive an audio signal; an audio clip extraction module configured to extract an audio clip from the audio signal; an audio clip processing module configured to generate metadata based upon the audio clip; and a first communication interface configured to transmit media identification data corresponding to the audio clip to a media identification server when the metadata based upon the audio clip meets a predetermined requirement, wherein the predetermined requirement comprises the metadata indicating that the audio clip comprises music.

In this way, the media identification data corresponding to an audio clip may only be sent to the media identification server when the metadata corresponding to the audio clip indicates that the audio clip comprises music. As such, the media identification data corresponding to an audio clip may only be sent to the media identification server when it be useful for identifying media content playing in the audio signal. This saves computational resources at the media identification server, as it does not need to unnecessarily process media identification data that may not be useful in identifying media content. Communications resources are also saved by not sending media identification data that may not be useful in identifying media content to the media identification server.

In one example, the metadata comprises a timestamp of a time at which the corresponding audio clip was received, and the metadata meets the predetermined requirement when the metadata indicates that the audio clip comprises music and the timestamp is within a predetermined time window.

In this way, media identification data corresponding to an audio clip may only be sent to the media identification server when the audio clip is received in the predetermined time window. For example, the predetermined time window is the opening hours of a venue in which the audio signal is received. As such, media identification data may be sent to the media identification server for identification of audio content that is played during the opening hours of the venue.

In one example, the audio clip processing module is configured to generate the metadata by applying a fast Fourier transform to the audio clip and determining a root mean square, RMS, value of the audio clip; and/or extracting beat data and/or melody data from the audio clip.

In this way a metadata packet with a much smaller file size than the audio clip or media identification data can be generated and used to determine whether to transmit the larger media identification data file to the media identification server, thereby saving communications resources compared to always sending the larger media identification data file.

In one example, the system further comprises a first storage configured to store the audio signal before the audio clip extraction module configured to extract an audio clip from the audio signal.

In this way, the quality of the audio clip can be improved as buffering the audio signal in the storage means can reduce any gaps, resulting in clicks or pops, in the extracted audio clip.

In one example, the first storage is a circular buffer.

In another example, the system further comprises a second storage configured to store the media identification data before the media identification data is transmitted to the media identification server.

In this way, the media identification data can be ready to be transmitted to the media identification server if and when requested.

The audio clip extraction module may be configured to extract a plurality of audio clips from the audio signal, wherein the plurality of audio clips each have a first length of time and are separated by a first time interval; and the audio clip extraction module is configured to adjust the length of the audio clips from a first length of time to a second length of time different to the first length of time, and/or adjust the first time interval to a second time interval different to the first time interval.

In this way, the length of the audio clips and the intervals between audio clips can be adjusted, for example if the media identification server needs more data to identify audio content, or if the media identification server is successfully identifying audio content and does not require as much data for future identifications. This balances improving the identification with saving computation and communications resources.

In one example, the system comprises: a media identification device comprising the audio input, the audio clip extraction module, and the first communication interface; and a media identification server comprising a metadata analysis module, an media identification data retrieval module, and a second communication interface; wherein the first communication interface at the media identification device is configured to transmit the metadata to second communication interface at the media identification server; the metadata analysis module at the media identification server is configured to determine whether the metadata meets the predetermined requirement; the media identification data retrieval module configured to instruct the second communication interface to request the media identification data corresponding to the metadata from the media identification device when the metadata meets the predetermined requirement; the first communication interface at the media identification device is configured to send the media identification data to the media identification server in response to the request received from the media identification server; and the second communication interface at the media identification server is configured to receive the media identification data.

In this way, the metadata analysis can take place at the media identification server, and the media identification server can request the media identification data corresponding the metadata when the metadata indicates that the audio clip corresponding to the media identification data comprises music. This saves communications resources as media identification data corresponding to audio clips that do not include music are not sent to the server.

In one example, the system comprises: a media identification device comprising the audio input, the audio clip extraction module, the first communication interface, and a metadata analysis module; and the media identification server comprises a second communication interface; wherein the metadata analysis module at the media identification device is configured to determine whether the metadata meets the predetermined requirement; the first communication interface at the media identification device is configured to send the media identification data corresponding to the metadata to the media identification server in response to the metadata analysis module determining that the metadata meets the predetermined requirement; and the second communication interface at the media identification server is configured to receive the media identification data.

In this way, the metadata analysis can take place at the media identification device. This saves server resources (e.g. cloud computation) from expended in analysing the metadata.

The metadata analysis module may be configured to determine whether the metadata meets the predetermined requirement by determining a score based upon content of metadata, wherein the score is indicative of a likelihood of the metadata having been generated based upon an audio clip that comprises music; and the metadata analysis module is configured to determine that the metadata meets the predetermined requirement when the score is greater than a predetermined threshold score, and further configured to determine that the metadata does not meet the predetermined requirement when the score is not greater than the predetermined threshold score.

The media identification server may further comprise a media identification module configured to: determine a matching media item that matches the media identification data; and store information associated with matching media item in an identified media database.

In this way, the media identification data can be used to identify audio content playing in the received audio signal.

In one example, the media identification module is configured to determine a matching media item that matches the media identification data based upon comparison scores between the media identification data and one more of the media items, and determine a media item of the media items that has a highest comparison score as the matching media item to the media identification data; and the media identification module is further configured to: store the information associated with the matching media item in the identified media database when the highest comparison score is greater than a comparison score threshold.

In this way, the identification of audio content playing in the received audio signal can be improved.

The media identification module may further be configured to determine a second matching media item that matches second media identification data when the highest comparison score is not greater than the comparison score threshold; and store the information associated with the matching media item in the identified media database when the information associated with the matching media item is the same as information associated with the second matching media item.

In this way, the identification of audio content playing in the received audio signal can be improved.

In one example, the media identification module is further configured to determine whether metadata corresponding to the second media identification data is indicative of a different media item when the matching media item and the second matching media item are not the same media item; and store a placeholder entry in the identified media database for the media identification data when the metadata corresponding to the second media identification data is indicative of a different media item.

In this way, if audio content playing in the received audio signal cannot be identified, a placeholder can be included in the identified media database. The corresponding media identification data can also be stored in storage at the server. The identification process can then be re-run on the corresponding media identification data at a later date. For example, if the audio content is of a new media item that is not yet in the library, the identification process can be re-run in the future when the new media item might have been added to the media library. As such, the identification of audio content playing in the received audio signal is improved.

In one example, the media identification module is configured to: request the audio clip extraction module to adjust an audio clip length from a first length of time to a second length of time, wherein the second length of time is greater than the first length of time, when the media identification module is unable to determine matching media items for media identification data corresponding to a plurality of audio clips; and/or request the audio clip extraction module to adjust an interval between audio clips from a first time interval to a second time interval, wherein the second time interval is less than the first time interval, when the media identification module is unable to determine matching media items for media identification data corresponding to a plurality of audio clips.

In this way, when the media identification module has been unable to successfully identify a number of media items playing in the audio signal, the audio clip length can be increased and/or the interval between audio clips can be decreased for subsequent identifications, to provide more data for the identification process so as to improve the likelihood of achieving successful identifications.

The media identification module may be configured to: request the audio clip extraction module to adjust an audio clip length from a first length of time to a second length of time, wherein the second length of time is less than the first length of time, when the media identification module determines matching media items for media identification data corresponding to a plurality of audio clips; and/or request the audio clip extraction module to adjust an interval between audio clips from a first time interval to a second time interval, wherein the second time interval is greater than the first time interval, when the media identification module is determines matching media items for media identification data corresponding to a plurality of audio clips.

In this way, when the media identification module has been able to successfully identify a number of media items playing in the audio signal, it may be that more media identification data than is necessary for the identification is being sent to the server. By reducing the audio clip length and/or increasing the interval between audio clips, less data is provided for subsequent identifications, thereby saving processing and communications resources.

In a second aspect, there is provided a media identification method, the method comprising: receiving an audio signal; extracting an audio clip from the audio signal; generating metadata based upon the audio clip; and transmitting media identification data corresponding to the audio clip to a media identification server when the metadata based upon the audio clip meets a predetermined requirement, wherein the predetermined requirement comprises the metadata indicating that the audio clip comprises music.

In a third aspect, there is provided a non-transitory computer-readable medium storing instructions that when executed by one or more processors cause the processors to perform operations comprising: receiving an audio signal; extracting an audio clip from the audio signal; generating metadata based upon the audio clip; and transmitting media identification data corresponding to the audio clip to a media identification server when the metadata based upon the audio clip meets a predetermined requirement, wherein the predetermined requirement comprises the metadata indicating that the audio clip comprises music.

In one example, the method of the second aspect, and the non-transitory computer-readable medium of the third aspect can include the features of the first aspect, as appropriate.

In a fourth aspect, there is provided a media identification server configured for communication with a media identification device, wherein the server comprises: a communication interface configured to receive metadata from the media identification device based upon an audio clip; a metadata analysis module configured to determine whether the metadata meets a predetermined requirement, wherein the predetermined requirement comprises the metadata indicating that the audio clip comprises music; a media identification data retrieval module configured to instruct the communication interface to request media identification data corresponding to the metadata from the media identification device when the metadata meets the predetermined requirement, the communication interface is further configured to receive the media identification data transmitted by the media identification device; and a media identification module configured to determine a matching media item that matches the media identification data, and store information associated with the matching media item in an identified media database.

In this way, the media identification data corresponding to an audio clip is only requested by the media identification server when the metadata corresponding to the audio clip indicates that the audio clip comprises music. As such, the media identification data corresponding to an audio clip can only be sent to the media identification server when it be useful for identifying media content playing in the audio signal. This saves computational resources at the media identification server, as it does not need to unnecessarily process media identification data that may not be useful in identifying media content. Communications resources are also saved by not sending media identification data that may not be useful in identifying media content to the media identification server.

In one example, the metadata analysis module is configured to determine whether the metadata meets the predetermined requirement by determining a score based upon content of metadata, wherein the score is indicative of a likelihood of the metadata having been generated based upon an audio clip that comprises music; and the metadata analysis module is configured to determine that the metadata meets the predetermined requirement when the score is greater than a predetermined threshold score, and further configured to determine that the metadata does not meet the predetermined requirement when the score is not greater than the predetermined threshold score.

The media identification module may be configured to determine a matching media item that matches the media identification data based upon comparison scores between the media identification data and one more of the media items, and determine a media item of the media items that has a highest comparison score as the matching media item to the media identification data; and the media identification module is further configured to: store the information associated with the matching media item in the identified media database when the highest comparison score is greater than a comparison score threshold. In this way, the identification of audio content playing in the received audio signal is improved.

In one example, the media identification module is further configured to determine a second matching media item that matches second media identification data when the highest comparison score is not greater than the comparison score threshold; and store the information associated with the matching media item in the identified media database when the information associated with the matching media item is the same as information associated with the second matching media item. In this way, the identification of audio content playing in the received audio signal is improved.

The media identification module may further be configured to determine whether metadata corresponding to the second media identification data is indicative of a different media item when the matching media item and the second matching media item are not the same media item; and store a placeholder entry in the identified media database for the media identification data when the metadata corresponding to the second media identification data is indicative of a different media item.

In this way, if audio content cannot be identified, a placeholder may be included in the identified media database. The corresponding media identification data can also be stored in storage at the server. The identification process can then be re-run on the corresponding media identification data at a later date. For example, if the audio content is of a new media item that is not yet in the library, the identification process can be re-run in the future when the new media item might have been added to the media library. As such, the identification of audio content playing in the received audio signal is improved.

In one example, the media identification module is configured to: request an audio clip extraction module at the media identification device to adjust an audio clip length from a first length of time to a second length of time, wherein the second length of time is greater than the first length of time, when the media identification module is unable to determine matching media items for media identification data corresponding to a plurality of audio clips; and/or request an audio clip extraction module at the media identification device to adjust an interval between audio clips from a first time interval to a second time interval, wherein the second time interval is less than the first time interval, when the media identification module is unable to determine matching media items for media identification data corresponding to a plurality of audio clips.

In this way, when the media identification module has been unable to successfully identify a number of media items playing in the audio signal, the audio clip length can be increased and/or the interval between audio clips can be decreased for subsequent identifications, to provide more data for the identification process so as to improve the likelihood of achieving successful identifications.

In one example, the media identification module is configured to: request an audio clip extraction module at the media identification device to adjust an audio clip length from a first length of time to a second length of time, wherein the second length of time is less than the first length of time, when the media identification module is determines matching media items for media identification data corresponding to a plurality of audio clips; and/or request an audio clip extraction module at the media identification device to adjust an interval between audio clips from a first time interval to a second time interval, wherein the second time interval is greater than the first time interval, when the media identification module determines matching media items for media identification data corresponding to a plurality of audio clips.

In this way, when the media identification module has been able to successfully identify a number of media items playing in the audio signal, it may be that more media identification data than is necessary for the identification is being sent to the server. By reducing the audio clip length and/or increasing the interval between audio clips, less data is provided for subsequent identifications, thereby saving processing and communications resources.

In one example, the media identification server of the fourth aspect can include the features of the first aspect, as appropriate.

BRIEF DESCRIPTION OF THE DRAWINGS

Embodiments are now described, by way of example, with reference to the drawings, in which.

DETAILED DESCRIPTION

Figure 1:
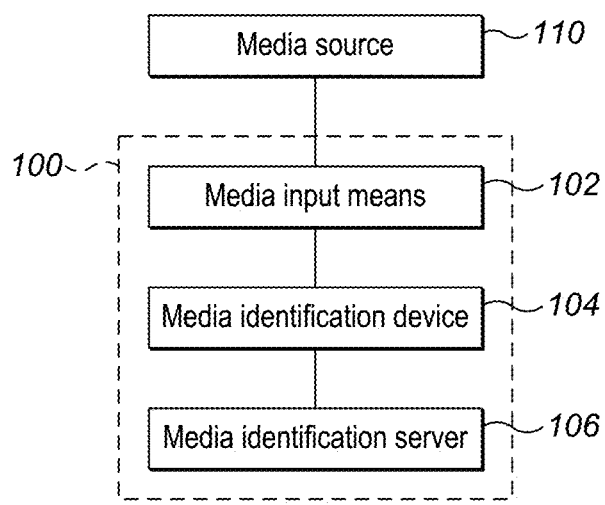
FIG. 1 is a block diagram of an exemplary media identification system.

FIG. 1 shows a block diagram of an exemplary media identification system 100 according to the present disclosure. The media identification system comprises an audio input 102 configured to receive an audio stream from a media source 110. The media source can be, but is not necessarily limited to, an audio source such as a loud speaker connected to a media system and configured emit an audio feed, or a line-out from a media system. In some examples, the media system can be a music system, a television, or the like. The audio input 102 can be, but is not necessarily limited to, one or more microphones configured to receive an emitted audio stream from a loudspeaker, or a line-in configured to receive an audio stream from a line-out.

The audio input 102 is connected to a media identification device 104. In some examples, the audio input 102 is integrated into the media identification device 104. The media identification device 104 can be a physical unit that can be installed in a public space to record audio using the audio input 102, and perform processing steps described in more detail subsequently, to generate samples or clips of the audio.

The media identification device 104 is connected to a cloud entity such as one or more servers, referred to herein interchangeably as a server or media identification server 106. The audio samples are transmitted to the media identification server 106, from the media identification device 104, and the media identification server 106 identifies the media emitted by the media source by performing processing steps described in more detail subsequently.

In use, the audio input 102 and media identification device 104 can be physically located in a public environment in which media is being broadcast. For example, the audio input 102 and media identification device 104 can be located in a café, restaurant, or bar, a shop or shopping centre, a nightclub, or any other public location.

In a specific example, the media identification device 104 and media identification server 106 are components of a media identification system that is configured to identify music broadcast in a public space. The media identification device 104 receives audio content using the audio input 102, and performs processing steps to generate samples of the audio. The audio samples are then transmitted to the media identification server 106 which identifies the music being played. The identified music is stored in a 'playlist' of tracks that have been identified as having been played. This 'playlist' can then be output to, or accessed by, performing rights organisations and/or collective management organisations so that royalties can be suitably apportioned to the rights holders of the identified music that is determined to have been played in the public space.

Figure 2:
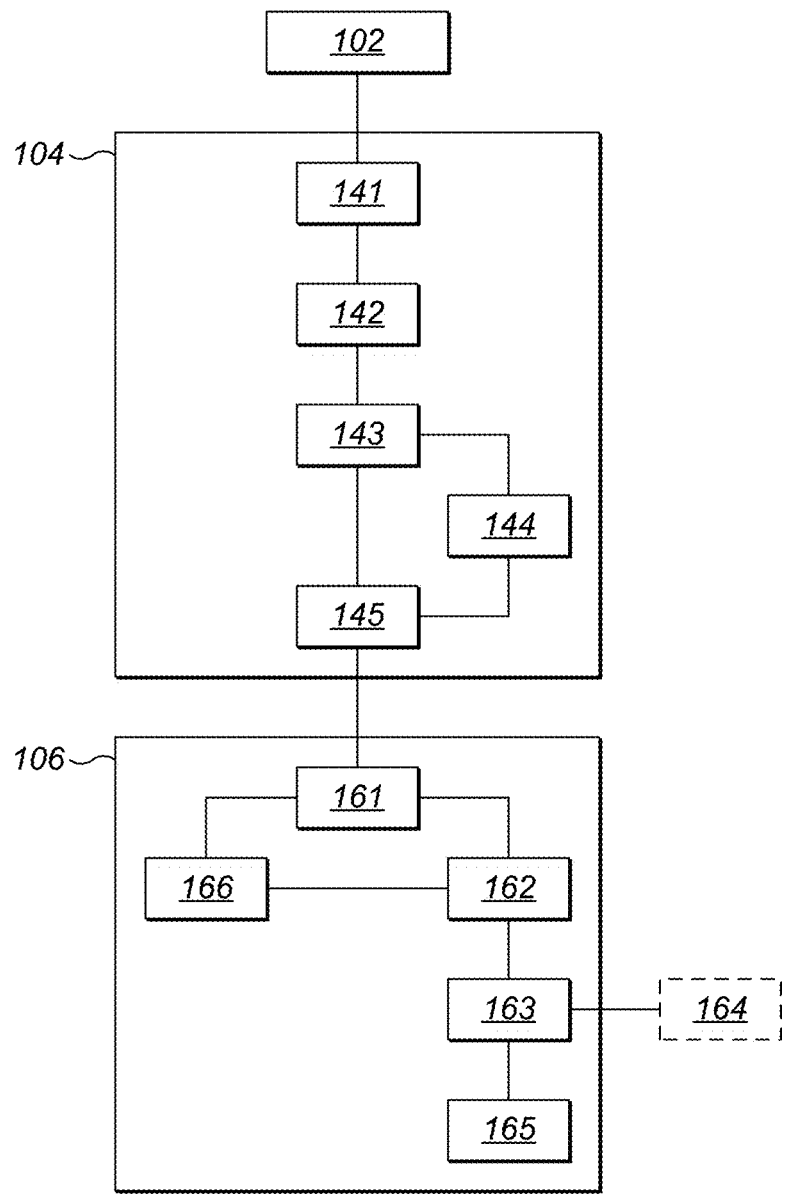
FIG. 2 is a more detailed block diagram of the media identification system of FIG. 1, according to a first example.
Figure 3A:
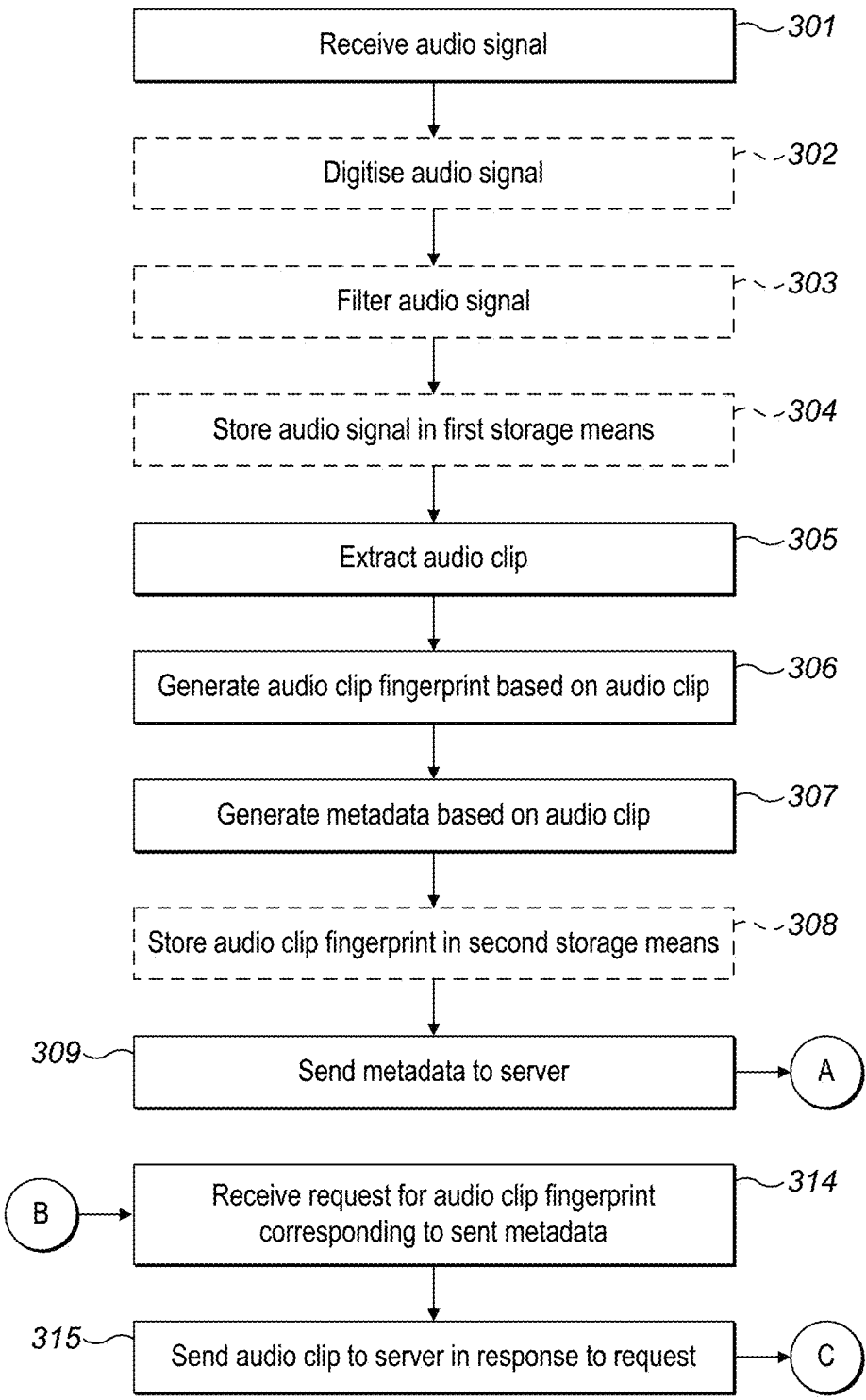
FIGS. 3A and 3B are process flow diagrams of the operation of the media identification system of FIG. 2.
Figure 3B:
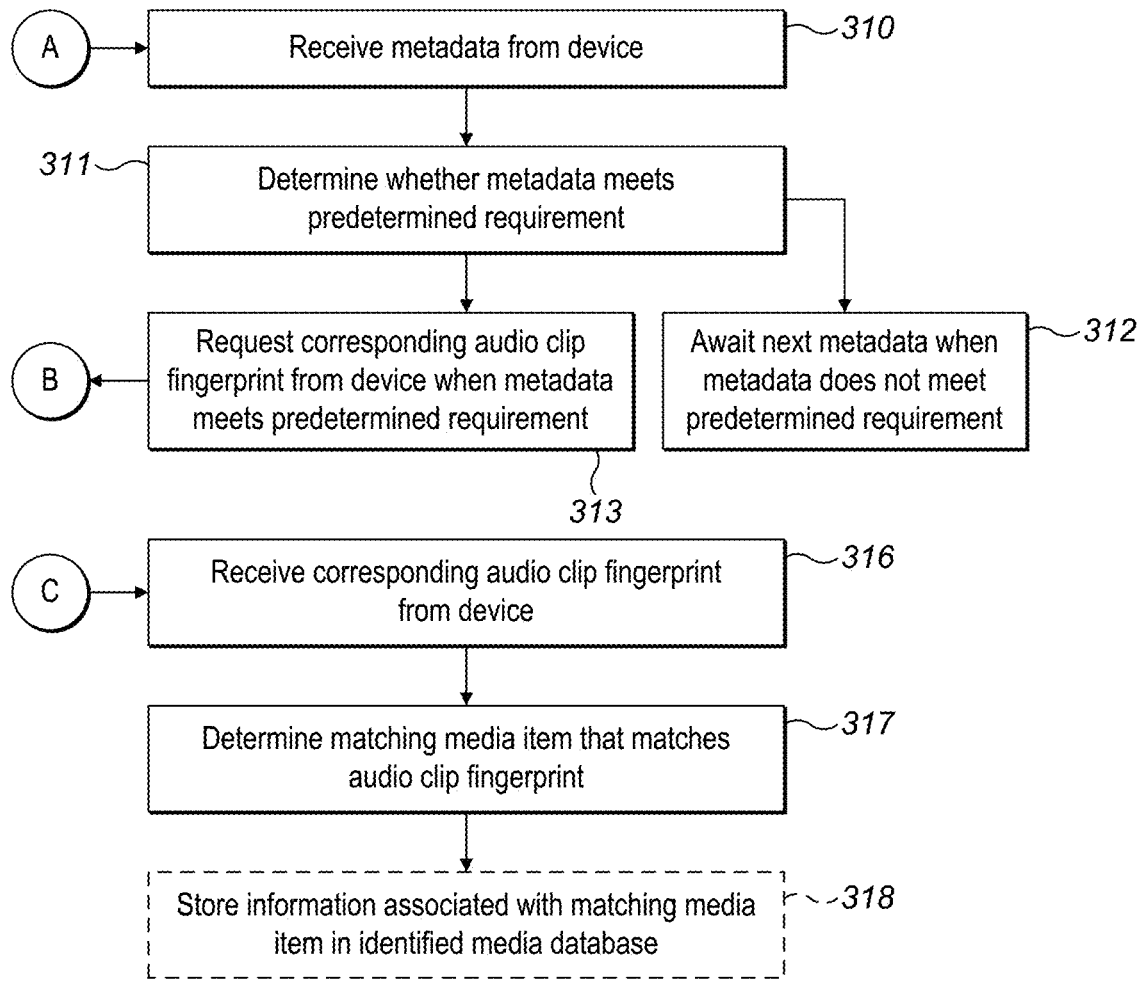

FIG. 2 shows a more detailed block diagram of the media identification system, and FIGS. 3A and 3B present an accompanying process flow of steps performed by the media identification device 104 and media identification server 106 in the process of identifying broadcast audio content (e.g. musical tracks or songs broadcast in a public environment).

At step 301, the media identification device 104 receives an audio signal, or audio stream, as already described, from the audio source by the audio input 102.

The received audio signal can then be optionally digitized at a digitisation module, such as an analogue-to-digital converter, at step 302. Optionally, at step 303, the audio signal can be filtered using an audio filtering module to clean the signal. As such, steps 302 and 303 can provide a digitized, cleaned audio signal.

Optionally, at step 304, the audio signal (the digitized and/or cleaned audio signal if steps 304 and/or 304 are included) is stored in a first storage 141 at the media identification device 104. The first storage 141 can be a buffer configured to store a predetermined amount of received audio signal. In a specific example, the first storage 141 can be a circular buffer. The circular buffer stores the most recently received X seconds of the audio signal on a first-in-first-out basis; in an example X=60 seconds.

At step 305, an audio clip extraction module 142 extracts an audio clip from the audio signal. An audio clip can be considered as a segment of sample of the audio signal. The audio clip can be extracted from the audio signal stored in the first storage 141. Extracted audio clips can be of a predetermined length of time. The audio clip extraction module 142 can extract the audio clips with predetermined time intervals between each audio clip. As will be described in more detail subsequently, the audio clip extraction module 142 can adjust the audio clip length from a first audio clip length to a second audio clip length that is different to the first audio clip length. The audio clip extraction module 142 can also adjust the time interval between the audio clips from a first time interval to a second time interval that is different to the first time interval.

In some examples, the audio clip length can be adjusted by incremental amounts. In other examples, the audio clips length can be adjusted between a fixed shorter length and a fixed longer length.

In some examples, the time interval between the audio clips can be adjusted by incremental amounts. In other examples the time interval between the audio clips can be adjusted between a fixed shorter length (i.e. a fixed higher rate of audio clip extraction) and a fixed longer length (i.e. a fixed lower rate of audio clip extraction).

An audio clip processing module 143 can generate an audio clip fingerprint based upon the extracted audio clip, at step 306. The audio clip fingerprint can be generated using known techniques for converting an audio clip to a fingerprint. The audio clip fingerprint can be considered as media identification data that is to be used to identify media content, such as a musical track, that is playing the audio clip. The identification of the content is described in more detail subsequently.

The audio clip processing module 143 also generates metadata based upon the extracted audio clip, at step 307. The metadata can be generated by a applying a fast Fourier transform (FFT) to the audio clip with a plurality of buckets (or bins). The FFT can be normalized. The FFT is used to provide frequency information of the audio clip. Generating the metadata can also comprise determining an RMS (root mean square) value of the audio clip. The RMS value of the audio clip can be a single value that is the average RMS value for the entire clip. The RMS value can be used to provide an average amplitude of the audio in the room in which the media identification device 104 is arranged. Generating the metadata can further comprise performing beat detection on the audio clip, and extracting beat data. Optionally, generating the metadata can further comprise performing melody detection on the audio clip, and extracting melody data. As such, the metadata can comprise a fast Fourier transform of the audio clip with a plurality of buckets, an RMS value of the audio clip, extracted beat data of the audio clip, and/or extracted melody data of the audio clip.

The metadata can include a timestamp that indicates corresponding to the arrival time of the audio content in the audio clip at the media identification device 104.

The metadata can be configured in the form of a metadata packet that is used to determine whether the audio clip is likely to contain recognisable content, such as recognisable music. The metadata packet can be very small in size, for example around 30 bytes. For each audio clip fingerprint that is generated, a corresponding metadata packet is generated.

The audio clip fingerprint is then stored in a second storage 144 at the media identification device 104, optionally at step 308. The second storage 144 can be a buffer configured to hold the audio clip fingerprints in a database for a predetermined amount of time (for example, but not limited to, one week). In this way, the audio clip fingerprints are ready and available to be transmitted to the media identification server 106 when requested (as discussed subsequently).

The media identification device 104 can have a first communication interface 145 that is configured for communication with a second communication interface 161 at the media identification server 106. The communication interface between the media identification device 104 and the media identification server 106 can be any suitable type of interface. For example, the media identification device 104 may connect to the media identification server 106 using a communication network (such as the Internet) by a wired means (for example, an Ethernet connection, or the like) or a wireless connection (for example a Wi-Fi, LTE, Bluetooth connection or the like).

At step 309, the metadata is sent from the media identification device 104 to the media identification server 106 using the communication interface. The media identification device 104 can push the metadata packet to the server every time a corresponding audio clip fingerprint is generated. The metadata can also be stored in storage at the media identification device 104. This can be advantageous as, if for example a communication connection between the media identification device 104 and the media identification server 106 is unavailable, the metadata and fingerprints can both be stored at the media identification device 104 until the communication connection with the media identification server 106 is restored. The media identification device 104 can then send the stored metadata packets to the media identification server 106 for processing when the connection is restored. In this way, media content identification is not missed when the communication connection is unavailable.

Referring to FIG. 3B, the media identification device 104 receives the metadata at step 310. At step 311, a metadata analysis module 166 at the server determines whether the metadata meets a predetermined requirement. The predetermined requirement can comprise the metadata being indicative of music, and optionally the metadata having a timestamp that falls within a predetermined time window.

The metadata analysis module 166 determines whether the metadata is indicative of music. That is, the metadata analysis module 166 determines whether the metadata indicates that the audio clip to which it corresponds comprises music.

In an example, determining whether the metadata is indicative of music can comprise calculating a weighted score based upon combining the RMS value in the metadata packet with each frequency bucket, and averaging this over a number of points in time to provide a score out of 100 for how likely it is that music is playing. Each band is compared to a threshold, and if the test is positive, a value is added to the score. A rolling average of the sets of results can be used, for example over four sets. An exemplary confidence value calculation is presented below:

Confidence value: Threshold
If (whole file RMS > Threshold in json)
{
Out =10
}
Else
{
Out =0
}
Confidence value: Band level
If ([Normalized Band 2 or Normalized Band 3 or Normalized Band 4 or Normalized Band 5]) == 1)

```
{
Out = 5
}
Else
{
Out =0
}
Confidence value: Band ratio 1
If (Band level out == 5 && one other Normalized Band is between 0.7
and 1.0 [not inc BAND 1])
{
Out = 5
}
Else
{
Out =0
}
Confidence value: Band ratio 2
If (Band level out == 5 && two other Normalized Bands are between 0.7
and 1.0 [not inc BAND 1])
{
Out = 5
}
Else
{
Out =0
}
Confidence value based on this data set = 0 to 25
Confidence value: Threshold + Confidence value: Band level +
Confidence value: Band ratio 1 + Confidence value: Band ratio 2 = 0 to
25
Confidence value based on sum of last 4 data sets = 0 to 100
```

In the example, the calculation is carried out to provide a score out of 25. The last four calculations are then added together, for a rolling score out of 100. In other examples, when there is enough information in a single reading, for example with melody and/or beat detection, the averaging across multiple readings may not be required.

A threshold score can be set such that when the score is above the threshold, the metadata is considered indicative of music, and when the score is not above the threshold the metadata is considered as not indicative of music. In an example, the threshold score may be a fixed value, such as 50, or 50%. In other examples, the threshold score may be adapted based upon the venue in which the device is located. For example, machine learning could be used to set the threshold using the recognition result as feedback.

The weightings for each part can be configurable as different environments have different requirements. For example, a quieter environment (such as a clothes shop) may require different weightings to a louder environment (such as a noisy bar). A shop using a small Bluetooth speaker will have different frequency content to a shop with built in speakers, versus a nightclub or pub with a properly installed audio system. These weightings can be preset based upon the type of venue in which the media identification device 104 is installed. Alternatively or additionally, machine-learning and/or artificial intelligence can be used to automatically adjust the weightings dynamically based upon noise in the venue.

The determination of whether the metadata is indicative of music can further comprise utilizing the extracted beat data. If a beat is identified, this can contribute to the determination that music is playing in the audio clip; if a beat is not identified, this can contribute to the determination that music is not playing in the audio clip. Identifying a beat can also be useful to determine if a song is likely to have changed. The determination of whether the metadata is indicative of music can further comprise utilizing the extracted melody data. If a melody is identified, this can contribute to the determination that music is playing in the audio clip; if a melody is not identified, this can contribute to the determination that music is not playing in the audio clip. The determination of whether metadata is indicative of music can further comprise determining whether a harmony is present in the clip. If a harmony is identified, this can contribute to the determination that music is playing in the audio clip; if a harmony is not identified, this can contribute to the determination that music is not playing in the audio clip. A melody may just be a person singing, whereas harmonized melodies can indicate live or recorded music.

The predetermined time window can be a period of time for which a venue in which the media identification device 104 is located is open to the public. That is, the predetermined time window can be the opening hours of the venue. This can be set during an installation or maintenance process for the media identification system. The metadata analysis module 166 can compare the timestamp in the metadata to the predetermined time window to determine whether timestamp falls with the predetermined time window.

When the metadata is not indicative of music (and/or the timestamp is not within the predetermined time window if included in the process), such that the metadata does not meet the predetermined requirement, the process continues to step 312 and the server waits for a next metadata packet. It this way, the media identification server 106 does not need to request the audio clip fingerprint, and the media identification device 104 does not need to send the audio clip fingerprint, when it is expected that the audio clip fingerprint will not have identifiable media content. This saves processing and communication resources when compared to sending every generated audio clip fingerprint to the media identification server 106, and the media identification server 106 attempting to identify media content that may not be present/recognisable.

When the metadata is indicative of music (and the timestamp is within the predetermined time window if included in the process), such that the metadata does meet the predetermined requirement, the process continues to step 313. At step 313, a media identification data retrieval module 162 at the media identification server 106 instructs the second communication interface 161 to request the audio clip fingerprint from the media identification device 104 that corresponds to the metadata that meets the predetermined requirement. Such a request is then sent from the second communication interface 161 to the media identification device 104.

The steps 305 to 312 or 313 are repeated for each audio clip that is extracted, at the predetermined time interval, by the audio clip extraction module 142.

Referring back to FIG. 3A, at step 314, the media identification device 104 receives the request for the audio clip fingerprint corresponding to the metadata that has been determined to meet the predetermined requirement at the first communication interface 145. The media identification device 104 access the corresponding audio clip fingerprint from the second storage 144, and the first communication interface 145 is then used to send the requested audio clip fingerprint to the second communication interface 161 at the media identification server 106, at step 315.

Returning to FIG. 3B, the server receives the corresponding audio clip fingerprint at the second communication interface 161 at step 316.

At step 317, the media identification module determines a matching media item that matches the audio clip fingerprint.

In an example, the server 106 looks up possible matching media items based upon the fingerprint. This can comprise the server 106 communicating with a music identification database system or media library 164 that returns to the server one or more possible matching media items that match the fingerprint, along with comparison scores based upon how closely the fingerprint matches each possible matching media item. The media library 164 can also return an indication of the time point into each possible matching media item at which the fingerprint matches the possible matching media item. For example, the media library 164 stores a plurality of media items having one or more known fingerprints; the media items can be songs or pieces of music, or the like. Each media item can have a plurality of associated fingerprints that correspond to consecutive periods of time within the audio content of the media item. The server can query the media library with the fingerprint, and the media library compares and matches the fingerprint against known fingerprints in one or more of these media items, and returns information associated with these media items to the server as the one or more possibly matching media items.

Whilst in this example the media library or music identification database system is described as a separate entity to the server 106, in some examples the media library or music identification database system can be integrated into the server itself.

In some examples, the media identification module 163 determines a media item that matches the audio clip fingerprint (that is, the matching media item), from the one or more possible matching media items, based upon the comparison scores between the audio clip fingerprint and the one or more media items. The media identification module 163 can determine a media item that has a highest comparison score as the closest matching media item.

The comparison score can be based upon how closely the media item matches the audio clip fingerprint (that is, how closely the received audio clip fingerprint matches the known fingerprint of the media item). In some examples, this can be calculated as a percentage to indicate the confidence of the match being correct. For example, when the audio clip fingerprint perfectly matches the known fingerprint of the media item, the comparison score would be 100%. When the audio clip fingerprint does not match the known fingerprint of the media item at all (i.e. a perfect mismatch), the comparison score would be 0%. Comparison scores of >0% and <100% are indicative of a partial match between the audio clip fingerprint and the known fingerprint. The higher the comparison score, the more closely the audio clip fingerprint matches the media item, and the higher the confidence in the match. Lower comparison scores can also be a consequence of higher levels of ambient noise in the audio clip from which the fingerprint is generated.

The media identification module 163 can determine information associated with the matching media item. The information can be a label associated with the media item, and include an artist name, a song title, and the like. For example, this can be provided from the media library. At step 318, information associated with the matching media item can optionally be stored in an identified media database 165 at the media identification server 106.

This process is then repeated; the audio input 102 continues to receive an audio signal, and the media identification device 104 continues to generate audio clip fingerprints and corresponding metadata packets. For subsequent audio clip fingerprints that have metadata packets that meet the predetermined requirement, the server continues to identify media items that match the audio clip fingerprints, and stores the information associated with the media items in the identified music database.

In this way, a playlist of media items that have been played in the vicinity of the media identification device 104 can be established. This playlist can then be output to, or accessed by, performing rights organisations and/or collective management organisations so that royalties can be suitably apportioned to the rights holders of the identified music that is determined to have been played in the public space.

In some examples, to prevent duplicates in the playlist, a new media item is only added to the playlist when it is a confirmed track is different from the previous media item.

Optionally, the determination of the matching media item (i.e. step 317) can also involve the following processes.

When the closest matching media item (i.e. the media item that has the highest comparison score to the audio clip fingerprint) has a comparison score that is greater than a threshold comparison score, the media identification module 163 can store the information associated with the media item in the identified media database 165. In an example, the threshold comparison score may be 90%.

If the identified media items that partially match the audio clip fingerprint, including the closest matching media item, have relatively low comparison scores, the case may be that the media identification module 163 cannot find a sufficiently close matching media item to the media content in the audio signal. The threshold comparison score can be considered as a filtering step to inhibit a closest matching media item that has a low confidence of actually being the correct match being added to the identified media database 165. It this way, the adding of incorrect media items to the identified media database 165 is avoided, thereby improving the media identification.

When the closest matching media item has a comparison score that is not greater than the threshold comparison score, the media identification module 163 can compare a second audio clip fingerprint to the media items in the media library 164 to determine a second matching media item, wherein the second matching media item is the closest matching media item to the second audio clip fingerprint.

Likewise, if there are a plurality of media items that have comparison scores that are above a second comparison threshold, the media identification module 163 can compare a second audio clip fingerprint to the media items in the media library 164 to determine a second matching media item, wherein the second matching media item is the closest matching media item to the second audio clip fingerprint. In some examples, the second comparison threshold is the same as the comparison threshold. In other examples, the second comparison threshold is lower than the comparison threshold. In this way, if there are a number of media items that match the fingerprint with a relatively high confidence, the media identification module 163 can utilize the second audio clip fingerprint to improve the accuracy of the determined matching media item.

In a particular example, this is carried out when the metadata associated with second audio clip fingerprint is indicative of the media item playing in the audio signal having not changed (that is, when the metadata of the second audio clip fingerprint is indicative of the same song playing in the metadata for the first audio clip and the metadata of the second audio clip). The media identification module 163 can identify a song has changed, or a likelihood that a song has changed, between two metadata packets by identifying a delta change in one or more of the FFT results. A delta change can be a significant change in any of the frequency buckets, overall RMS, melody content and/or the tempo of a beat detected. The media identification module 163 can also identify a song has changed between two metadata packets by identifying a tempo change, for example using the extracted beat information.

The second audio clip fingerprint is an audio clip fingerprint of an audio clip that has subsequently been extracted from the audio signal, and for which the metadata meets the predetermined requirement.

When information associated with the second matching media item is the same as the information associated with the (first) matching media item, the media identification module 163 stores the information associated with the matching media item in the identified media database 165. That is, when the closest matching media item to a first audio clip fingerprint is the same as the closest matching media item to the second audio clip fingerprint (i.e. when the media item with the highest comparison score to the first fingerprint is the same media item as the media item with the highest comparison score to the second fingerprint), the media identification module 163 can determine that both audio clip fingerprints match known fingerprints of the same media item. In this case, as both audio clip fingerprints relate to the same media item, there is a strong possibility that the identified matching media item is the song or musical track that is playing in the audio signal, even if the comparison scores are below the threshold comparison score.

This process can be further refined by determining if a time difference between the first audio clip fingerprint and the second audio clip fingerprint corresponds to a time difference between the known fingerprint that matches the first audio clip fingerprint, and the known fingerprint that matches the second audio clip fingerprint in the identified media item.

As explained, a media item can have a plurality of known fingerprints that correspond to periods of time in the audio content of the media item. For example, a 60 second media (i.e. a 60 second song or piece of music) item could have 30 consecutive fingerprints that are each 2 seconds long. The media library 164 can return the time point into each possible matching media item at which the fingerprint matches the possible matching media item based upon this.

The media identification module 163 compares the time point into the media file at which the first audio clip fingerprint matches with the time point into the media file at which the second audio clip fingerprint matches; when time between these two time points matches the time between the recording of the first audio clip upon which the first audio clip fingerprint is based and the recording of the second audio clip upon which the second audio clip fingerprint is based, there is a high confidence that the matching media item is the media item that is playing in the audio signal, and as such it is committed to the identified media database 165. In an example, this can be determined when the time frame between the first known fingerprint (the known fingerprint that at least partially matches the first audio clip fingerprint) and the second known fingerprint (the known fingerprint that at least partially matches the second audio clip fingerprint) belong to the same media item and are separated in time within the media item by an amount that is consistent with the time that has progressed between the first audio content fingerprint and the second audio content fingerprint.

In other words, if there is only partial confidence that the media item identified based upon an audio clip fingerprint is the correct media item, the next audio clip fingerprint (corresponding to the next audio clip) is requested, and its results are compared to that of the earlier audio clip fingerprint. If there is a common media item (or the media items matching the first and second fingerprints with the highest comparison scores are the same media item) in the results of the first audio clip fingerprint and the second audio clip fingerprint, with known fingerprints that have progressed by the correct time frame, then this media item (e.g. a song or piece of music) is almost certainly that which is playing in the audio signal received at the media identification device 104, and so it is committed to the identified media database 165.

If there is not a common media item in the results of the first audio clip fingerprint and the second audio clip fingerprint, with known fingerprints that have progressed by the correct time frame, more audio clip fingerprints can be requested. These can then be compared for common results amongst media items that match with lower confidence, but have known fingerprints that at least partially match the further audio clip fingerprints and are within the correct time frame progression.

Optionally, the aforementioned processes for determining and matching media items and storing the associated information in the identified media database 165 can be refined as follows. The media items in the media library 164 are of a known length. When an audio clip fingerprint matches one of the known fingerprints of the media item, and the information associated with the media item is stored in the identified media database 165, the media identification module 163 can calculate a remaining time of the media item. The remaining time is the time between a time point into the media item where the match occurs (e.g. the time of the known fingerprint in the media file) that matches the audio clip fingerprint, and the length of the media item.

For example, if the media item has a length of 3 minutes, and the time point of the match (for example the time point of the known fingerprint in the media file that matches the audio clip fingerprint) is at a time point of 2 minutes into the media file, the remaining time is 1 minute.

The media identification module 163 can instruct the media identification server 106 to stop processing the received metadata and/or audio clip fingerprints for this remaining time as the media item that is playing in the audio content has been successfully identified. The media identification server 106 then begins processing the metadata and/or audio clip fingerprints again after this remaining time has expired as it would then be expected that the next media item is playing in the audio signal, and should be identified using the aforementioned process. This feature can be optionally enabled and disabled; for example, it may be desirable to disable this feature in a venue such as a nightclub, where complete songs are not typically played, to avoid potentially missing any media items in the audio signal.

When a matching media item has not been determined and the second audio clip fingerprint (or further audio clip fingerprints, after the second audio clip fingerprint) has associated metadata that is indicative of the media item playing in the audio signal having changed between the corresponding audio clips, the media identification module 163 stores a placeholder entry in the identified media database 165. That is, if the song or piece of music appears to have changed between audio clip fingerprints, based upon their corresponding metadata, and the media item playing in the audio clip has not been identified, an 'unknown track' placeholder entry is stored. The process can then begin again to identify the next media item playing in the audio signal.

When the placeholder entry is stored in the identified media database 165, the associated audio clip fingerprints can be stored in storage at the server. The identification process can then be run again, against these unidentified audio clip fingerprints, at a later date in case they match a new media item that has been added to the media library 164 at a later date. In an example, this is only carried out when the media identification device 104 is known to be located in a location in which new media items are played; this can improve the likelihood of identifying new media content played, whilst not using excessive server resources if new media content is not played.

In a further refinement of the process, the media identification module 163 can be configured to look for common playlist patterns in the media items identified in the playlist of the identified media database 165.

Multiple media identification devices 104, at different locations, can be connected to the media identification server 106 (or media identification server 106s) with each having its own identified media database 165. If a plurality of media items (for example 3 or more) in the playlist of the identified media database 165 match other playlists, for example in the identified media databases of other media identification devices, either at the same time or a different time, the media identification module 163 can identify that the media identification device 104 is listening to a common playlist, such as the same radio channel, album or streaming playlist as one or more other media identification devices 104. In an example, the media items in the playlist of the identified media database 165 must match a threshold number of other playlists for the media identification module 163 to identify that the media identification device 104 is listening to a common playlist. For example, this threshold number of other playlists can be five.

When the media identification module 163 identifies a common playlist pattern, the server can reduce the rate at which audio clip fingerprints are requested from the media identification device 104. The comparison between the audio clip fingerprints and the media items in the media library 164 can then be carried out at a much lower rate whilst the media identification module 163 continues to determine that the playlist of identified tracks is following the common playlist pattern. In this way, communications and processing resources at the server are saved.

When the media identification module 163 has not been able to successfully determine matching media items for a plurality of audio clips, the media identification server 106 can send a request to the media identification device 104 by the communication interface to adjust the audio clip length from a first audio clip length to a second longer audio clip length. In this way, for subsequent audio clips, the media identification module 163 will have more audio clip fingerprint information available with which to attempt to identify media in the received audio content as the audio clip fingerprints will be generated based upon longer audio clips. As such, the likelihood of identifying a matching media item can be improved.

Alternatively or additionally, when the media identification module 163 has not been able to successfully determine matching media items for a plurality of audio clips, the media identification server 106 can send a request to the media identification device 104 by the communication interface to adjust the first time interval between audio clips to a second shorter time interval. In this way, subsequent audio clips (and/or the corresponding metadata) will arrive at a higher frequency for the media identification module 163 to attempt to identify the media in the received audio content. Again, this can improve the likelihood of identifying a matching media item.

In this way, greater processing and communications resources need only be used when needed, thereby making an efficient use of these resources.

The media identification module 163 not being able to successfully determine matching media items for a plurality of audio clips can comprise the media identification module 163 failing to identify any media items for a predetermined amount of time (for example 30 minutes). Alternatively or additionally, the media identification module 163 not being able to successfully determine matching media items for a plurality of audio clips can comprise the media identification module 163 failing to identify a predetermined number of musical tracks (for example 3 tracks) in a row, when the metadata is indicative of the track having changed, or failing to identify a certain percentage of tracks in a given period of time.

If the media identification module 163 successfully determines matching media items for a plurality of audio clips, it can be indicative of the audio clip fingerprints being of high quality, or higher quality than is necessary to identify media items corresponding to the audio content. In this case, the media identification server 106 can send a request to the media identification device 104 by the communication interface to adjust the audio clip length from a first audio clip length to a second shorter audio clip length. In this way, smaller audio clip fingerprints are generated, using lower processing resources, and lower communications resources are required to send these smaller audio clip fingerprints from the media identification device 104 to the media identification server 106. This avoids wasting processing and communications resources in generating and sending audio clip fingerprints that are larger than necessary.

Alternatively or additionally, when the media identification module 163 successfully determines matching media items for a plurality of audio clips, the media identification server 106 can send a request to the media identification device 104 by the communication interface to adjust the first time interval between audio clips to a second longer time interval. In this way, fewer audio clip fingerprints are generated, using lower processing resources, and lower communications resources are required to send the few audio clip fingerprints from the media identification device 104 to the media identification server 106. This avoids wasting processing and communications resources in generating and sending more audio clip fingerprints than are larger than necessary.

The media identification module 163 successfully determining matching media items for a plurality of audio clips can comprise the media identification module 163 successfully identifying a predetermined number of musical tracks (for example 3 tracks) in a row, when the metadata is indicative of the track having changed, or identifying a certain percentage of tracks in a given period of time.

Figure 4:
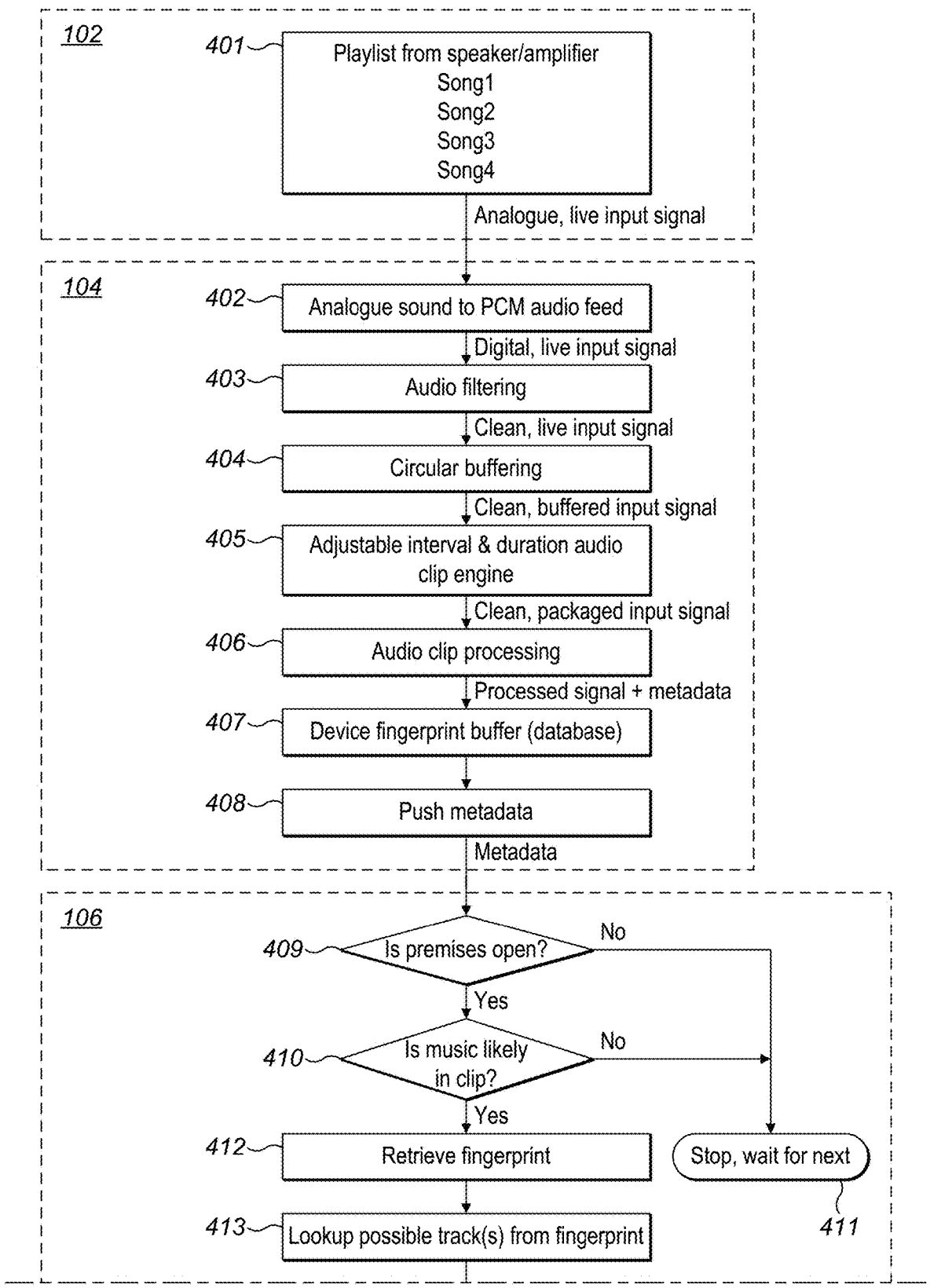
FIG. 4 is a flow diagram of an exemplary media identification process performed the system of FIG. 1 and FIG. 2.
Figure 4:
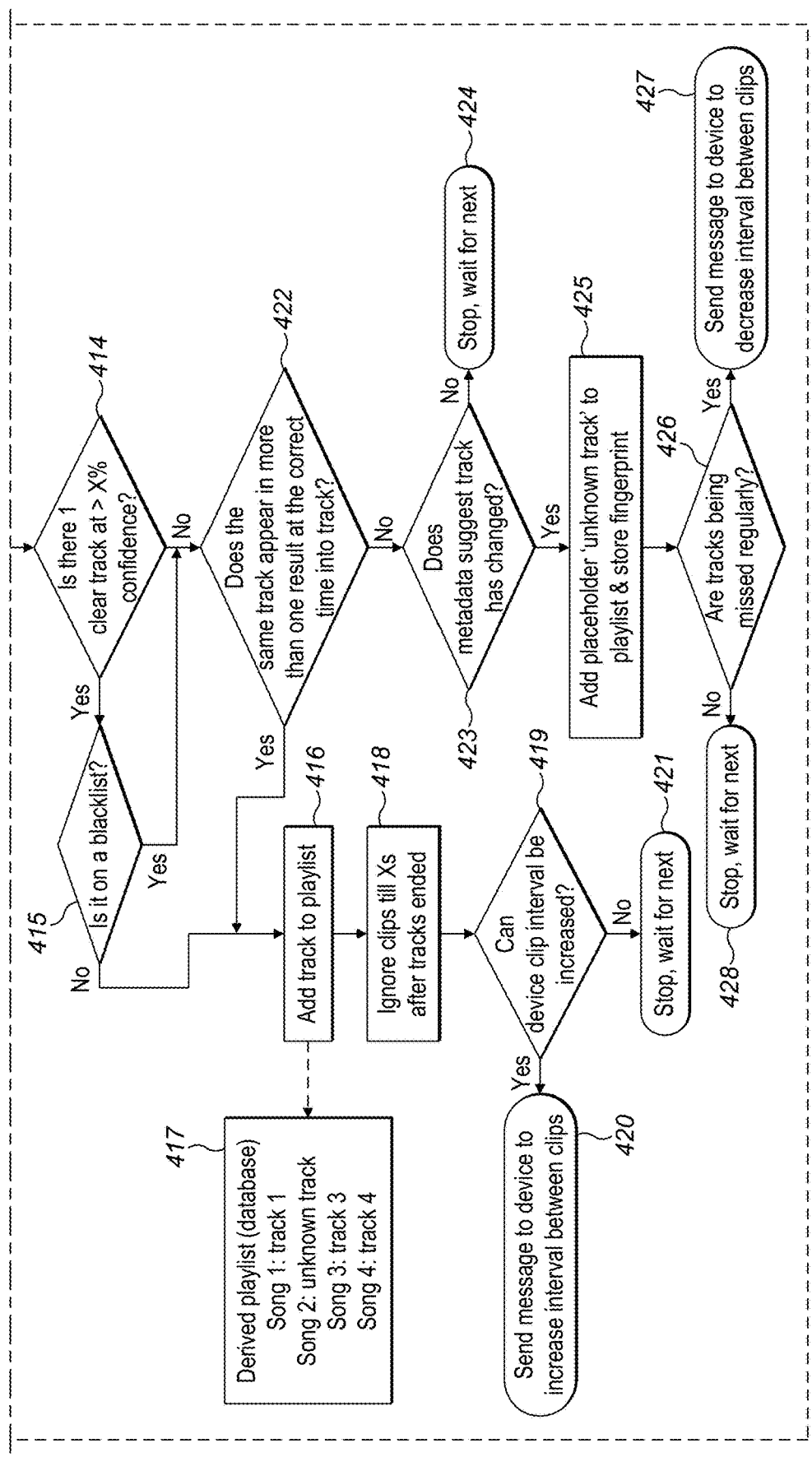

FIG. 4 shows an exemplary flow chart of an example media identification process in accordance with the system described with reference to FIGS. 2, 3A and 3B.

At step 401 the audio input 102 receives an audio signal that comprises music being played in the vicinity of the media identification device 104, for example from speakers or an amplifier, as described with reference to step 301. In the example, the audio signal comprises four songs (Song 1, Song 2, Song 3, and Song 4). The received audio signal can be considered as an analogue, live input signal. The process then progresses to step 402.

At step 402 the analogue, live input signal is processed by an analogue-to-digital converter, as described with reference to step 302, to digitize the analogue sound to a PCM (pulse code modulated) audio feed. A digital, live input signal is then output. The process then progresses to step 403.

At step 403 audio filtering is applied to the digital, live input signal, to output a clean live input signal, as described with reference to step 303. The process then continues to step 404.

At step 404 the clean, live input signal is buffered in a circular buffer, as described with reference to step 304. The circular buffer may hold, for example, the most recent 60 seconds of the audio signal on a first-in-first-out basis. A clean, buffered input signal is output from the circular buffer, and the process continues to step 405.

At step 405 an adjustable interval and duration audio clip engine (such as the audio clip extraction module 142 described with reference to FIGS. 2 and 3A, and step 305) extracts audio clips from the clean, buffered input signal and outputs a clean packaged input signal, for example in the form of audio clips. The process then continues to step 406.

At step 406 the clean, packaged input signal is received at an audio clip processing stage (such as the audio clip processing module 143 described with reference to FIGS. 2 and 3A, and steps 306 and 307). The audio clip processing stage generates the audio clip fingerprint and corresponding metadata based upon the extracted audio clip. The process then continues to step 407.

At step 407, the audio clip fingerprint is stored in a fingerprint buffer at the media identification device 104, as described with reference to step 308. The process then continues to step 408.

At step 408, the metadata is pushed to the media identification server 106, as described with reference to step 309. The process then continues to step 409.

The media identification server 106 receives the metadata as described with reference to step 310, and at step 409 determines whether the metadata has a timestamp that falls within a predetermined time window when the premises at which the media identification device 104 is located is open. When the timestamp falls outside of the predetermined time window, the process continues to step 411. When the timestamp falls within the predetermined time window, the process continues to step 410.

At step 410 the media identification server 106 determines whether it is likely that there is music in the audio clip to which the metadata corresponds. That is, the media identification server 106 determines whether the metadata meets the predetermined requirement of indicating that the audio clip comprises music. When the metadata does indicate that the audio clip comprises music, the process continues to step 412. When the metadata does not indicate that the audio clip comprises music, the process continues to step 411.

Steps 409 and 410 correspond to step 311 as described with reference to FIG. 3B.

At step 411 the server stops and waits for the next metadata packet to arrive, as described with reference to step 312.

At step 412 the server retrieves the audio clip fingerprint that corresponds to the metadata from the media identification device 104, as described with reference to steps 313 to 316. The process then continues to step 413.

At step 413 the server looks up possible tracks (i.e. media items) based upon the audio clip fingerprint, as described with reference to step 317. The process then continues to step 414.

At step 414 the server determines whether there is one track that has a confidence score (also referred to as a comparison score) that has a confidence likelihood of greater than X %, where X is the threshold confidence score, as previously described. When there is one track with a confidence score that exceeds the threshold, the process can continue to step 415. When there is not one track with a confidence score that exceeds the threshold, or there are multiple tracks exceeding the threshold, the process can continue to step 422.

At step 415, the server determines whether the track with a confidence score that exceeds the threshold is on a blacklist. When the track is on a blacklist, the process continues to step 422. When the track is not on a blacklist, the process continues to step 416. Step 415 may be optional, and the process may instead progress directly to step 416 when there is a track with a confidence score that exceeds the threshold.

Tracks that are on a blacklist can be tracks that are commonly misinterpreted for background noise, for example at a particular venue, such as a 'washing machine sound effect' where there is a dishwasher or air conditioner running. Tracks on a blacklist can also be tracks with a long hiss, silence or ambiance section as part of the track. These get 'blacklisted' as they are recognized as having abnormal play patterns such as appearing at night or always at exactly the same time in the track. However, instead of ignoring them, if these are recognized twice and at the correct time in the song, then they are treated as 'real' plays.

At step 416 the track is added to the playlist, as described with reference to step 318.

Returning to step 422, when there is not one track with a confidence score that exceeds the threshold or there are multiple tracks exceeding the threshold, or the track is on a blacklist, the server checks whether the same track appears in the results for a subsequent audio clip fingerprint at the correct time into the track, as previously described. That is, the server checks whether the same track appears in more than one result. If the same track does appear in the results for one or more subsequent audio clip fingerprints at the correct time into the track, the process continues to step 416 and the track is added to the playlist. If the same track does appear in the results for one or more subsequent audio clip fingerprints at the correct time into the track, the process continues to step 423.

At step 423 the server determines whether the metadata corresponding to the subsequent audio clip fingerprint indicates that the track has changed, as previously described. When the metadata indicates that the track has changed, the process continues to step 424 and the server stops and waits for the next metadata packet and/or audio clip fingerprint to arrive.

When the metadata does not indicate that the track has changed, the process continues to step 425. At step 425 the server adds an 'unknown track' placeholder to the playlist and stores the audio clip fingerprint corresponding to the unidentified track, as previously described.

The process then continues to step 426 at which the server determines whether tracks are regularly being missed. When tracks are regularly being missed, the process continues to step 427, and the server sends a message to the media identification device 104 instructing that the interval between audio clips should be decreased, as previously described, to try to improve the track identification for subsequent audio clips. When tracks are not regularly being missed, the process continues to step 428, and the server stops and waits for the next metadata packet and/or audio clip fingerprint to arrive.

Returning to step 416, when the track is added to the playlist, the process continues to step 418 and audio clip fingerprints relating to audio clips are ignored by the server until X seconds have expired, and the track has ended. X seconds can be considered the remaining time of the track after the audio clip fingerprint, as previously described.

The process then continues to step 419. At step 419, the server determines whether the interval between audio clips extracted by the media identification device 104 can be increased. For example, if the server has successfully identified a plurality of tracks, the audio clip interval can be increased to save processing and communication resources, as previously described. When the audio clip interval can be increased, the process continues to step 420, and the server sends a message to the media identification device 104 instructing the media identification device 104 to increase the audio clip interval. When the audio clip interval cannot be increased, the process continues to step 421 and the server stops and waits for the next metadata packet and/or audio clip fingerprint to arrive to identify the next track.

Step 417 shows the derived playlist, based upon the successfully identified tracks. Song 1 has been successfully identified as 'Track 1', Song 3 has been successfully identified as 'Track 3', and Song 4 has been successfully identified as 'Track 4'. Song 2 could not be identified, and an 'Unknown Track' placeholder has been added as described with reference to step 425.

An alternative media identification system to that described with reference to FIGS. 2, 3A and 3B is presented in FIG. 5.

Figure 5:
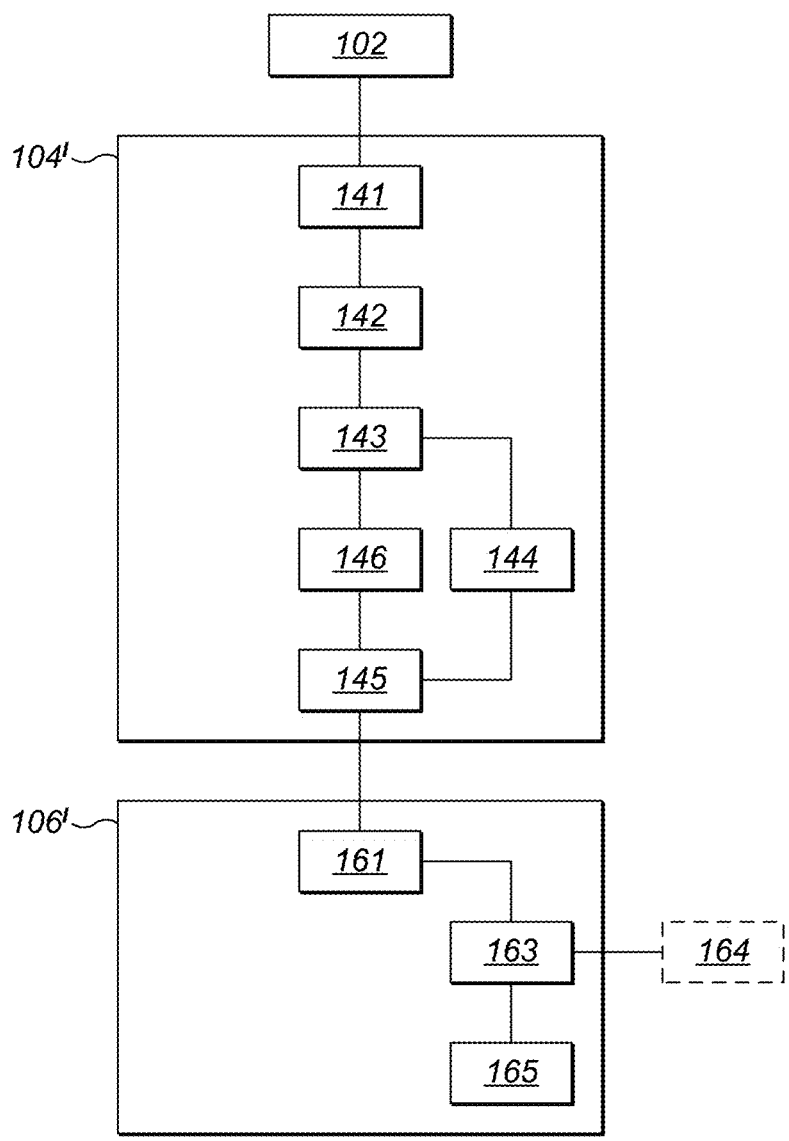
FIG. 5 is a more detailed block diagram of the media identification system of FIG. 1, according to a second example.

The media identification system of FIG. 5 is substantially the same as that of FIG. 2, and the matching reference numerals relate to matching features between the two embodiments. The system of FIG. 5 differs from the system of FIG. 2 in that a metadata analysis module 146 is located at the media identification device 104' rather than the media identification server 106'. In operation, the media identification system of FIG. 5 performs steps 301 to 308, and 316 to 318, in the same manner as the media identification system of FIG. 2. Instead of performing steps 309 to 315, the metadata analysis module 146 at the media identification device 104' receives the metadata packet from the audio clip processing module 143 and determines whether the metadata meets the predetermined requirement in the same manner as the metadata analysis module 166 of FIG. 2 (performing the steps described with reference to 311). When the metadata does meet the predetermined requirement, the media identification device 104' pushes the corresponding audio clip fingerprint to the media identification server 106', by the communication interface, and the media identification server 106' carries out steps corresponding to 316 to 318 on the audio clip fingerprint. When the metadata analysis module 146 determines that the metadata does not meet the predetermined requirement, the corresponding audio clip fingerprint is not pushed to the media identification server 106'; instead, the metadata analysis module waits for the next metadata packet (corresponding to the next audio clip) and repeats the process. In some examples, in the system of FIG. 5, the media identification device 104' can also send the metadata packets to the media identification server 106' so that they can be used in the media item identification process, if needed, as described with reference to FIGS. 2, 3A and 3B.

The media identification system of FIG. 5 provides an advantage in a reduced use of cloud computing resources (i.e. reduced processing resources at the media identification server 106) as the server does not need to perform steps 309 to 315. However, media identification system of FIG. 2 provides an advantage in a reduced use of processing resources at the media identification device 104, thereby allowing for a smaller construction and lower power usage at the media identification device 104.

The media identification systems and method described herein can be used for broadcast monitoring, and as a passive way to detect audience numbers for radio or TV channels, or indeed any feed with audio content. For example, a plurality of media identification devices can be connected to the media identification server, at different locations; the media identification server can monitor how many of the media identification devices are recording the same audio content by the identified media items being played in the audio content being consistent for these devices.

Although the present disclosure is directed to audio content being emitted by the media source, the skilled person will readily understand that the same principles can be applied to other media, such as video content.

The processing steps described herein may be stored in one or more non-transitory computer-readable media. A computer-readable medium can include non-volatile media and volatile media. Volatile media can include semiconductor memories and dynamic memories, amongst others. Non-volatile media can include optical disks and magnetic disks, amongst others.

It will be readily understood to the skilled person that the preceding embodiments in the foregoing description are not limiting; features of each embodiment may be incorporated into the other embodiments as appropriate without departing from the scope of the disclosure.

What is claimed is:

1. One or more non-transitory computer-readable media storing computer-executable instructions that, when executed by a computing system comprising a processor, cause the computing system to:
   receive, by an audio input, an audio signal;
   extract, by an audio clip extraction module, an audio clip from the audio signal;
   generate, by an audio clip processing module, metadata based upon the audio clip, the metadata comprising a timestamp of a time at which the corresponding audio clip was received;
   transmit, by a first communication interface, the metadata to a media identification server; receive, by the first communication interface, a request from a media identification server for media identification data corresponding to the audio clip when the metadata meets a predetermined requirement, wherein the predetermined requirement comprises the metadata indicating that the audio clip comprises music and the timestamp being within a predetermined time window; and transmit, by the first communication interface, the media identification data corresponding to the audio clip to the media identification server in response to the request.

2. One or more non-transitory computer-readable media storing computer-executable instructions that, when executed by a computing system comprising a processor, cause the computing system to:
   receive, by an audio input, an audio signal; extract, by an audio clip extraction module, an audio clip from the audio signal; generate, by an audio clip processing module, metadata based upon the audio clip, generating the metadata comprises at least one of: applying a fast Fourier transform to the audio clip and determining a root mean square, RMS, value of the audio clip; or extracting from the audio clip at least one of beat data, or melody data; transmit, by a first communication interface, the metadata to a media identification server; receive, by the first communication interface, a request from a media identification server for media identification data corresponding to the audio clip when the metadata meets the predetermined requirement, the predetermined requirement comprising the metadata indicating that the audio clip comprises music; and transmit, by the first communication interface, the media identification data corresponding to the audio clip to the media identification server in response to the request.

3. One or more non-transitory computer-readable media storing computer-executable instructions that, when executed by a computing system comprising a processor, cause the computing system to:
receive, by an audio input, an audio signal; extract, by an audio clip extraction module, an audio clip from the audio signal; generate, by an audio clip processing module, metadata based upon the audio clip; transmit, by a first communication interface, the metadata to a media identification server; receive, by the first communication interface, a request from a media identification server for media identification data corresponding to the audio clip when the metadata meets the predetermined requirement, the predetermined requirement comprising the metadata indicating that the audio clip comprises music; transmit, by the first communication interface, the media identification data corresponding to the audio clip to the media identification server in response to the request; and
store, by a first storage, the audio signal before extracting an audio clip from the audio signal.

4. One or more non-transitory computer-readable media storing computer-executable instructions that, when executed by a computing system comprising a processor, cause the computing system to:
receive, by an audio input, an audio signal;
extract, by an audio clip extraction module, an audio clip from the audio signal;
generate, by an audio clip processing module, metadata based upon the audio clip;
transmit, by a first communication interface, the metadata to a media identification server;
receive, by the first communication interface, a request from a media identification server for media identification data corresponding to the audio clip when the metadata meets the predetermined requirement, the predetermined requirement comprising the metadata indicating that the audio clip comprises music;
transmit, by the first communication interface, the media identification data corresponding to the audio clip to the media identification server in response to the request; and
store, by a first storage comprising, a circular buffer, the audio signal before extracting an audio clip from the audio signal.

5. One or more non-transitory computer-readable media storing computer-executable instructions that, when executed by a computing system comprising a processor, cause the computing system to: further comprising
receive, by an audio input, an audio signal; extract, by an audio clip extraction module, an audio clip from the audio signal; generate, by an audio clip processing module, metadata based upon the audio clip; transmit, by a first communication interface, the metadata to a media identification server; receive, by the first communication interface, a request from a media identification server for media identification data corresponding to the audio clip when the metadata meets the predetermined requirement, the predetermined requirement comprising the metadata indicating that the audio clip comprises music; transmit, by the first communication interface, the media identification data corresponding to the audio clip to the media identification server in response to the request; and
store, by a second storage, the media identification data before the media identification data is transmitted.

6. One or more non-transitory computer-readable media storing computer-executable instructions that, when executed by a computing system comprising a processor, cause the computing system to:
receive, by an audio input, an audio signal;
extract, by an audio clip extraction module, au audio clip from the audio signal comprising a plurality of audio clips from the audio signal, wherein the plurality of audio clips each have a first length of time and are separated by a first time interval, and at least one of adjusting the length of the audio clips from a first length of time to a second length of time different to the first length of time, or adjusting the first time interval to a second time interval different to the first time interval, generate, by an audio clip processing module, metadata based upon the audio clip; transmit, by a first communication interface, the metadata to a media identification server; receive, by the first communication interface, a request from a media identification server for media identification data corresponding to the audio clip when the metadata meets the predetermined requirement, the predetermined requirement comprising the metadata indicating that the audio clip comprises music; and transmit, by the first communication interface, the media identification data corresponding to the audio clip to the media identification server in response to the request.

7. One or more non-transitory computer-readable media storing computer-executable instructions that, when executed by a computing system comprising a processor, cause the computing system to:
receive, by an audio input, an audio signal; extract, by an audio clip extraction module, an audio clip from the audio signal; generate, by an audio clip processing module, metadata based upon the audio clip;
determine, by a metadata analysis module, whether the metadata meets the predetermined requirement by determining a score based upon content of metadata, wherein the score is indicative of a likelihood of the metadata having been generated based upon an audio clip that comprises music;
determine, by the metadata analysis module, that the metadata meets the predetermined requirement when the score is greater than a predetermined threshold score;
determine, by the metadata analysis module, that the metadata does not meet the predetermined requirement when the score is not greater than the predetermined threshold score; transmit, by a first communication interface, the metadata to a media identification server; receive, by the first communication interface, a request from a media identification server for media identification data corresponding to the audio clip when the metadata meets the predetermined requirement, the predetermined requirement comprising the metadata indicating that the audio clip comprises music; and transmit, by the first communication interface, the media identification data corresponding to the audio clip to the media identification server in response to the request.

8. One or more non-transitory computer-readable media storing computer-executable instructions that, when executed by a computing system comprising a processor, cause the computing system to:
receive, by an audio input, an audio signal; extract, by an audio clip extraction module, an audio clip from the audio signal; generate, by an audio clip processing module, metadata based upon the audio clip; transmit, by a first communication interface, the metadata to a media identification server; receive, by the first communication interface, a request from a media identification server for media identification data corresponding to the audio clip when the metadata meets the predetermined requirement, the predetermined requirement comprising the metadata indicating that the audio clip comprises music; transmit, by the first communication interface, the media identification data corresponding to the audio clip to the media identification server in response to the request; determine, by the media identification server, a matching media item that matches the media identification data based upon comparison scores between the media identification data and one more of the media items; determine, by the media identification server, a media item of the media items that has a highest comparison score as the matching media item to the media; store, by the media identification server, information associated with matching media item in an identified media database when the highest comparison score is greater than a comparison score threshold; determine, by the media identification server, a second matching media item that matches second media identification data when the highest comparison score is not greater than the comparison score threshold; store, by the media identification server, the information associated with the matching media item in the identified media database when the information associated with the matching media item is the same as information associated with the second matching media item; determine, by the media identification server, whether metadata corresponding to the second media identification data is indicative of a different media item when the matching media item and the second matching media item are not the same media item, and
store, by the media identification server, a placeholder entry in the identified media database for the media identification data when the metadata corresponding to the second media identification data is indicative of a different media item.

9. One or more non-transitory computer-readable media storing computer-executable instructions that, when executed by a computing system comprising a processor, cause the computing system to:
receive, by an audio input, an audio signal; extract, by an audio clip extraction module, an audio clip from the audio signal; generate, by an audio clip processing module, metadata based upon the audio clip; transmit, by a first communication interface, the metadata to a media identification server, receive, by the first communication interface, a request from a media identification server for media identification data corresponding to the audio clip when the metadata meets the predetermined requirement, the predetermined requirement comprising the metadata indicating that the audio clip comprises music; transmit, by the first communication interface, the media identification data corresponding to the audio clip to the media identification server in response to the request; determine, by the media identification server, a matching media item that matches the media identification data; store, by the media identification server, information associated with matching media item in an identified media database; request, by the media identification server, an adjustment, by the audio clip extraction module, to an audio clip length from a first length of time to a second length of time, wherein the second length of time is greater than the first length of time, when the media identification module is unable to determine matching media items for media identification data corresponding to a plurality of audio clips, or
request, by the media identification server, an adjustment, by the audio clip extraction module, to an interval between audio clips from a first time interval to a second time interval, wherein the second time interval is less than the first time interval, when the media identification module is unable to determine matching media items for media identification data corresponding to a plurality of audio clips.

10. One or more non-transitory computer-readable media storing computer-executable instructions that, when executed by a computing system comprising a processor, cause the computing system to:
receive, by an audio input, an audio signal; extract, by an audio clip extraction module, an audio clip from the audio signal; generate, by an audio clip processing module, metadata based upon the audio clip; transmit, by a first communication interface, the metadata to a media identification server; receive, by the first communication interface, a request from a media identification server for media identification data corresponding to the audio clip when the metadata meets the predetermined requirement, the predetermined requirement comprising the metadata indicating that the audio clip comprises music; transmit, by the first communication interface, the media identification data corresponding to the audio clip to the media identification server in response to the request
determine, by the media identification server, a matching media item that matches the media identification data; store, by the media identification server, information associated with matching media item in an identified media database; and request, by the media identification server, an adjustment, by the audio clip extraction module, to an audio clip length from a first length of time to a second length of time, wherein the second length of time is less than the first length of time, when the media identification module determines matching media items for media identification data corresponding to a plurality of audio clips, or
request, by the media identification server, an adjustment, by the audio clip extraction module, to an interval between audio clips from a first time interval to a second time interval, wherein the second time interval is greater than the first time interval, when the media identification module is determines matching media items for media identification data corresponding to a plurality of audio clips.

* * * * *